No. 790,675. PATENTED MAY 23, 1905.
F. C. & W. T. CANAVAN.
HORSESHOE.
APPLICATION FILED DEC. 9, 1904.
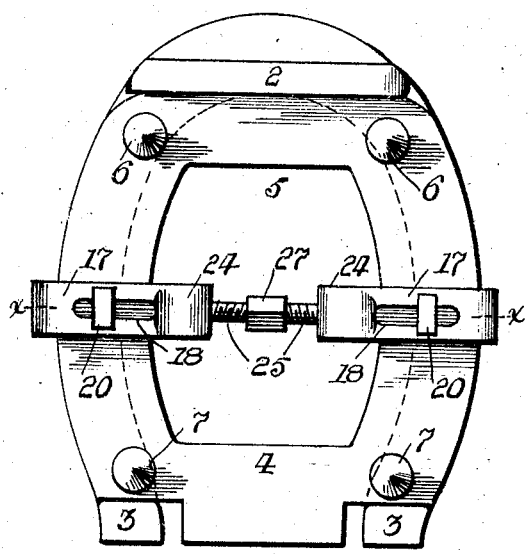
Fig. 1.
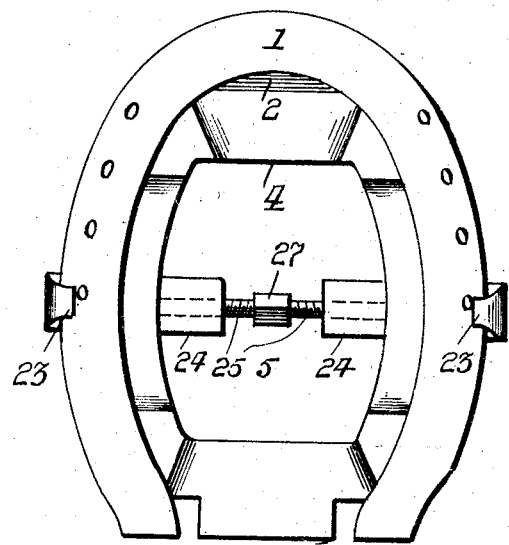
Fig. 2.
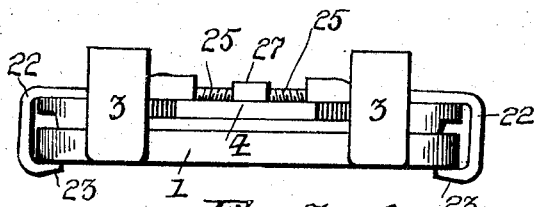
Fig. 3.
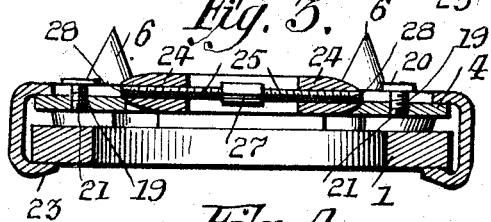
Fig. 4.
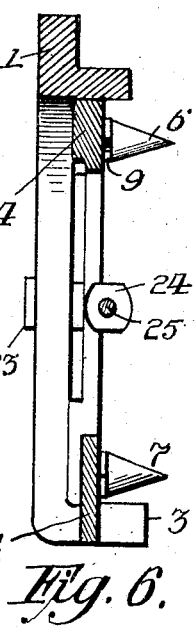
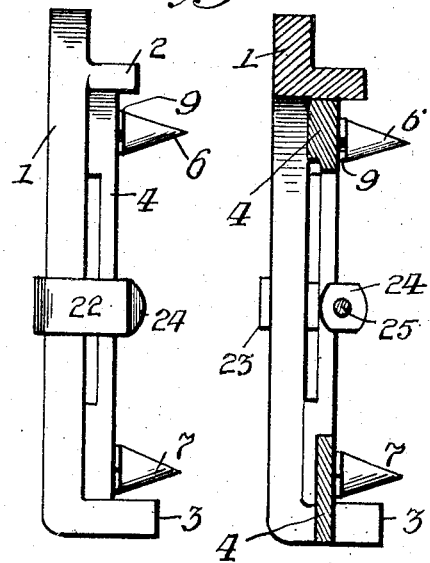
Fig. 5.   Fig. 6.
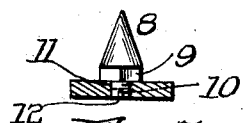
Fig. 7.
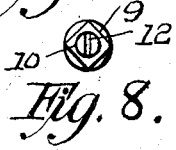
Fig. 8.
Fig. 9.
Witnesses:
Inventors,
F. C. Canavan,
W. T. Canavan,
By
Attorneys.

No. 790,675.                                         Patented May 23, 1905.

UNITED STATES PATENT OFFICE.

FREDERICK C. CANAVAN AND WILLIAM T. CANAVAN, OF PITTSBURG, PENNSYLVANIA.

HORSESHOE.

SPECIFICATION forming part of Letters Patent No. 790,675, dated May 23, 1905.

Application filed December 9, 1904. Serial No. 236,241.

*To all whom it may concern:*

Be it known that we, FREDERICK C. CANAVAN and WILLIAM T. CANAVAN, citizens of the United States of America, residing at Pittsburg, in the county of Allegheny and State of Pennsylvania, have invented certain new and useful Improvements in Horseshoes, of which the following is a specification, reference being had therein to the accompanying drawings.

This invention relates to certain new and useful improvements in attachments for horseshoes; and the object of the invention is to provide an attachment carrying a plurality of calks and novel means for detachably securing the attachment to a horseshoe.

Another object of this invention is to provide a novel form of calk-plate which may be easily and quickly secured to a horseshoe, and we have constructed our improved attachment whereby the calks can be easily and quickly removed should the same be damaged or become dull.

The attachment as constructed by us is adapted to be secured upon the shoe of a horse when the ground is frozen and covered with ice, and the attachment is so constructed that the calks carried by the attachment will prevent the horse from slipping. In devices of this character heretofore used it has been impossible to remove the entire calk when the same has become dull or broken, and in instances where this has happened it has been impossible to remove the shank portion of the calk when the calk proper has been broken from the shank. In connection with our improved attachment we employ novel means for securing the same to a horseshoe whereby it can be easily and quickly adjusted when it is necessary to use the same.

The above objects, together with the many other advantages entering into the invention, will be hereinafter more fully described and then specifically pointed out in the claims, and, referring to the drawings accompanying this application, like numerals of reference designate corresponding parts throughout the several views, in which—

Figure 1 is a bottom plan view of our improved attachment, illustrating the same in position upon a horseshoe. Fig. 2 is a top plan view of a horseshoe, illustrating our improved attachment secured thereto. Fig. 3 is a rear elevation of our improved attachment as illustrated in Fig. 1 of the drawings. Fig. 4 is a transverse vertical sectional view taken on the line *x x* of Fig. 1. Fig. 5 is a side elevation of our improved attachment. Fig. 6 is a vertical sectional view of the same. Fig. 7 is a detail sectional view of a portion of the calk-plate, illustrating one of the calks secured therein. Fig. 8 is a bottom plan view of one of the calks, and Fig. 9 is a detail view of a spanner-wrench which may be used in connection with our improved attachment.

In the accompanying drawings we have illustrated our improved attachment as being secured to a horseshoe of the ordinary type, and this shoe is designated by the reference-numeral 1. The toe piece or plate of the shoe is designated by the reference-numeral 2, and the "heel-calks" by the reference-numerals 3 3.

Our improved attachment comprises a plate 4, which is substantially the shape of the horseshoe, said plate being provided with a central opening 5 to reduce the weight of the same and permit of a thorough ventilation of the foot of the animal to which the same is attached. The calks of our improved attachment are designated by the reference-numerals 6 6 and 7 7, and these calks are preferably secured in the plate 4 adjacent to the toe-piece 2 and the heel-calks 3 3. One of the calks is illustrated in Figs. 7 and 8 of the drawings, and each calk comprises a cone-shaped portion 8, the base of which terminates in a square or hexagonal shank portion 9. The shank portion 9 is contracted, as indicated at 10, and is provided with screw-threads 11, which are adapted to engage in threaded openings formed in the plate 4. The contracted shank portion 10 is provided with a slot 12 in its end, whereby should the cone-shaped portion of the calk be broken the contracted shank portion 10 can be easily removed by a suitable instrument, such as a screw-driver or the tapering end 14 of a spanner-wrench 15. This wrench is illustrated in Fig.

9 of the drawings and is adapted to be carried by the attendant of the horse or animal to which our improved attachment is secured. The spanner portion 10 of the wrench is employed for gripping the square or hexagonal shank portion 9 of the calks in order that the calk may be removed when it is desired to sharpen the same.

To secure our improved attachment to a horseshoe, we have devised the gripping-arms 17 17, which are slidably mounted upon the bottom of the plate 4. Each gripping-arm is slotted, as indicated at 18. A set-screw 19, having an oblong head 20, is employed to retain the gripping-arms in engagement with the plate 4. The end of the screw-threaded shank portion of each screw is provided with a slot 21, whereby should the heads 20 of these screws become damaged or broken from the shank portion the screw-threaded shank portion of each screw can be easily removed. The spanner-wrench 15 may also be employed in connection with these set-screws to rotate the same.

The outer ends of the gripping-arms are bent upwardly, as indicated at 22, and are then bent inwardly, as indicated at 23, to grip the top face of the horseshoe 1. To secure the gripping-arms in engagement with the shoe, we have enlarged the inner ends of the gripping-arms, as designated at 24 24, and in these enlarged ends we have rotatably mounted the screw 25. The ends of this screw are reversely threaded, (see Fig. 4,) and centrally of the screw we provide a square portion 26, similar to a nut. The outer ends of the screw 25 are slotted, as indicated at 28 28, whereby should the central portion of the screw be broken the ends of the screw can be readily removed, this being facilitated by the slots 18 18.

From the foregoing description, taken in connection with the drawings, it will be observed that we have constructed the principal parts of our improved attachment whereby they can be readily removed should they be damaged or broken, and by the particular construction of the calks it is possible to easily and quickly remove the same in order that they may be sharpened when they have become dull, and the manner of detachably securing the calks and the gripping-arms to the plate 4 permits of this plate being used several times in connection with new calks and new gripping-arms.

While we have herein shown the preferred manner of constructing our improved attachment for horseshoes, we desire it to be understood that these attachments may be made of different shapes to conform to the contour of horseshoes, and we do not care to confine ourselves to the specific number of calks or gripping-arms that may be used, and various other changes may be made in the details of construction without departing from the general spirit and scope of the invention.

What we claim, and desire to secure by Letters Patent, is—

1. A device of the type set forth comprising a plate, said plate having an opening formed therein, detachable calks carried by said plate, slotted gripping-arms slidably mounted on said plate, set-screws passing through the slots in said gripping-arms and means for securing said arms together, substantially as described.

2. The combination with a horseshoe having a permanent toe-piece and heel-calks, of a plate seating on the bottom of the shoe and bearing against said toe-piece and heel-calks, removable toe-calks and heel-calks carried by said plate, slotted gripping-arms having upwardly and inwardly extending ends embracing the edge of the shoe and set-screws carried by the plate and passing through the slots in said arms.

In testimony whereof we affix our signatures in the presence of two witnesses.

FREDERICK C. CANAVAN.
WILLIAM T. CANAVAN.

Witnesses:
H. C. EVERT,
E. E. POTTER.